Patented July 23, 1946

2,404,725

UNITED STATES PATENT OFFICE 2,404,725

POLYMER SOLUTIONS

Arthur O. Rogers, Lewiston, N. Y., assignor to E. I. du Pont de Nemours & Company, Wilmington, Del., a corporation of Delaware No Drawing. Application November 18, 1944, Serial No. 564,182

9 Claims. (Cl. 260—32)

This invention relates to a new composition of matter and shaped articles produced therefrom. More particularly, this invention relates to an organic solvent solution of polyacrylonitrile, i. e. polymerized acrylonitrile or polymerized vinyl cyanide $(CH_2=CHCN)_x$, and copolymers and interpolymers of acrylonitrile in which at least 85% by weight of the polymer is acrylonitrile, and to the production of shaped articles from said organic solvent solution of said polymers of acrylonitrile.

Polyacrylonitrile, and copolymers and interpolymers of acrylonitrile with other polymerizable substances, for example vinyl or acrylic compounds, in which at least 85% by weight of the polymer is acrylonitrile have been known for some time and recognized as possessing desirable physical and chemical properties including toughness and insolubility in and insensitivity to common organic solvents such as methyl or ethyl alcohol, acetone, ethyl ether, ethyl acetate, hydrocarbon solvents, chlorinated hydrocarbons and the like. Because of these facts, numerous attempts have been made to form these polymeric materials into yarns, films and other shaped articles.

The copending application of George H. Latham, Serial No. 562,012, filed November 4, 1944, discloses solutions of polyacrylonitrile in dimethyl carbamyl compounds and the production of extruded and otherwise shaped articles and structures from such solutions. The above-said application of George H. Latham represents the first successful dissolution of polyacrylonitrile in a solvent to produce a solution which is suitable for the production of commercially useful textile yarns or wrapping tissue films and similar tough, flexible structures.

The present application relates to a similarly satisfactory dissolution of polyacrylonitrile in an organic solvent taken from a different class of organic compounds and the polyacrylonitrile solutions produced thereby are similarly satisfactory for the production of tough, flexible, dense, colorless yarns and films which are suitable for use in practically all general commercial applications of such products.

It has been known heretofore that concentrated aqueous solutions of inorganic salts such as lithium bromide, zinc chloride and sodium sulfocyanide will dissolve polyacrylonitrile and it has been proposed (Rein U. S. Patent No. 2,140,921) to employ the resulting solutions in the formation of yarns and films. However, it has been found substantially impossible to use the resulting compositions in such a manner. Their extrusion into coagulating baths of the type proposed (including such non-solvents for acrylonitrile as water, dilute acid, dilute salt solutions, etc.) result in the formation of shaped articles that contain large amounts of the inorganic salt of the proposed solvent. These salts are distributed throughout the structure and destroy the continuity of the polyacrylonitrile phase and the structure possesses poor physical properties. Removal of these salts, when possible, results in the formation of a porous, spongy, weak, undesirable structure that is very brittle and completely unsuited for use as a yarn or film. Moreover, when it is attempted to form a multifilament yarn by extruding, for example the proposed aqueous sodium sulfocyanide polyacrylonitrile composition, into a dilute acid bath, it is found that the individual filaments obtained stick together to form an essentially monofilament structure that is extremely brittle and cannot be bent or worked without breaking.

U. S. Patent No. 2,167,537 to Tobis points out that certain copolymers of acrylonitrile and an acrylic acid ester (those copolymers containing not more than 65% of acrylonitrile) are soluble in mixtures of organic solvents such as dioxan, monochlorbenzene, cyclohexanone, etc. However, these liquids are incapable of dissolving or even swelling polyacrylonitrile, or copolymers of acrylonitrile containing higher percentages of acrylonitrile, i. e. acrylonitrile polymers of the type with which this invention is concerned. As previously mentioned, polymers containing such high percentages (at least 85% by weight) of acrylonitrile are especially desirable for use because of their good physical properties and excellent chemical resistance.

It has also been proposed (Rein U. S. Patent No. 2,117,210) to dissolve polyacrylonitrile in molten quaternary ammonium salts such as benzyl pyridinium chloride, an ionizable salt. Although the resulting solution can allegedly be used to form yarns or films of polyacrylonitrile, the solution itself is dark red to brown in color, indicating that some decomposition of the polyacrylonitrile or some reaction between the polyacrylonitrile and the molten salt has probably taken place. Such solutions are not satisfactory for the production of commercially useful, shaped articles of polyacrylonitrile. Here again, it has been found practically impossible to obtain filamentary structures such as yarns from the composition. Films or filaments, when obtainable, are extremely brittle; they are highly colored and very weak, presumably because of the presence within them of residual quaternary ammonium salt. Removal of this salt is difficult and the resulting structures contain numerous and large voids that make the structures substantially useless for commercial purposes.

It is therefore an object of this invention to dissolve polyacrylonitrile, or a copolymer or interpolymer of acrylonitrile in which at least 85% by weight of the polymer is acrylonitrile, in a solvent which does not react with or decompose the polymer and which may be substantially completely removed from the structures formed of such a solution.

It is another object of this invention to produce a solution of polyacrylonitrile, or a copolymer or interpolymer of acrylonitrile in which at least 85% by weight of the polymer is acrylonitrile, in a solvent which does not react with or decompose the polymer, the solution being suitable for the formation of commercially useful, void free articles of polyacrylonitrile, for example yarns which are suitable as textile yarns and films which are suitable as wrapping tissue.

It is another object of this invention to produce a solution of polyacrylonitrile, or a copolymer or interpolymer of acrylonitrile in which at least 85% by weight of the polymer is acrylonitrile, in a volatile organic solvent, which solution is stable over extended periods of time and is eminently suited for use in the manufacture of shaped articles such as yarns, films, tubes, straws, artificial horsehair, bristles and ribbons, or when highly concentrated, for use in the manufacture of molded articles.

It is a still further object of this invention to produce shaped articles and structures of polyacrylonitrile, or copolymers or interpolymers of acrylonitrile in which at least 85% by weight of the polymer is acrylonitrile.

It is still another object of this invention to produce a shaped article or structure of polyacrylonitrile, or copolymers or interpolymers of acrylonitrile in which at least 85% by weight of the polymer is acrylonitrile, for example a yarn, film, tube, bristle or the like which is tough, flexible, tenacious and free from voids.

Other objects of the invention will appear hereinafter.

The objects of the invention may be accomplished in general by dissolving polyacrylonitrile, or copolymers or interpolymers of acrylonitrile in which at least 85% by weight of the polymer is acrylonitrile in

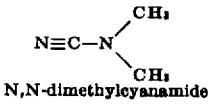

N,N-dimethylcyanamide

The following example in which parts, proportions and percentages are by weight illustrates an application of the principles of the invention.

*Example*

Fifteen (15) parts of polyacrylonitrile possessing an average molecular weight of 120,000 are ground to an average particle size of 200 mesh and intimately mixed with 85 parts of N,N-dimethylcyanide, the mixture then being heated over a period of fifteen minutes to a temperature of 150° C. to form a clear solution. The resulting solution is cast at a temperature of 170° C. on to a polished, metal surface heated to a temperature of 100° C. to form a thin, transparent film of polyacrylonitrile.

The polyacrylonitrile for use with the invention is preferably prepared by the ammonium persulfate catalyzed polymerization of monomeric acrylonitrile dissolved or emulsified in water. It can, however, be prepared by any other suitable type of polymerization reaction such as for example, the emulsion type reaction disclosed by U. S. Patent No. 2,160,054 to Bauer et al. The polymer preferably possesses a molecular weight within the range of 15,000 to 250,000 or even higher, as calculated from viscosity measurements by the Staudinger equation:

$$\text{Molecular weight} = \frac{N_{sp}}{K_m C}$$

wherein:

$K_m = 1.5 \times 10^{-4}$ $N_{sp} = \text{specific viscosity} = \frac{\text{viscosity of solution}}{\text{viscosity of solvent}} - 1$ and $C$ = concentration of the solution expressed as the number of moles of the monomer (calculated) per liter of solution.

The molecular weight of the polymer obtained is dependent on such factors as the concentration of the monomer in the water, the amount and type of catalyst present, the temperature of the reaction, etc. For example, polyacrylonitrile, having a molecular weight of approximately 60,000 can be prepared as follows: To 94 pounds of distilled water heated to 40° C. add 40 grams of ammonium persulfate catalyst and 80 grams of sodium bisulfite activator. Then add 16 pounds of acrylonitrile slowly with stirring over a period of two hours. The polyacrylonitrile having the above said molecular weight will precipitate from the solution. Increasing or decreasing the amount of the catalyst, while maintaining the other conditions constant, decreases or increases the molecular weight of the polymer. Acrylonitrile copolymers and interpolymers containing at least 85% by weight of acrylonitrile and likewise preferably having a molecular weight of 15,000 to 250,000 or higher can be prepared in a similar manner.

Although the invention is preferably applied to the preparation of solutions of polyacrylonitrile, it comprehends the dissolving of copolymers and interpolymers in which acrylonitrile is copolymerized or interpolymerized with other polymerizable substances such as, for example, compounds containing one or more ethylenic linkages including vinyl and acrylic compounds such as vinyl acetate, vinyl chloride, acrylic acid and its esters and homologues as well as olefinic or diolefinic hydrocarbons such as styrene, isobutylene and butadiene and polymers of such substances. The solvent of this invention is eminently satisfactory for use with those polymers which contain a large amount of acrylonitrile, for example polymers that contain in the polymer molecule at least 85% by weight of acrylonitrile and which have generally been regarded by the art as being completely insoluble in all common organic solvents. Nor is this solvent limited to use with acrylonitrile polymers of any given molecular weight although it is especially satisfactory for use with those polymers having an average molecular weight within the range 15,000 to 250,000 as determined by viscosity data using the Staudinger equation and intended for use in the manufacture of yarns or films.

Acrylonitrile polymer solutions formed by the use of the solvent of this invention are stable at room temperature (approximately 20° C.) and at temperatures considerably above room temperature. Shaped structures and articles can be produced by extruding such solutions into an evaporative or coagulative medium.

The solvent of this invention dissolves or retains the polymer in clear solution only at elevated temperatures, for example at temperatures of 100° C. or higher, below which temperature the composition resembles a gel. While at such elevated temperatures, the composition has the appearance of a true solution, when cooled, it generally takes on the appearance of a gel which may, on standing, undergo syneresis. Reheating of this gel or syneresed mass however causes it to again return to solution form.

Shaped articles obtained from solvent solutions of polyacrylonitrile in accordance with this invention and from which the solvent is subsequently removed are substantially free of foreign matter and voids and substantially undecomposed and chemically unchanged from the polymer prior to its solution.

The above-described organic solvent solutions of acrylonitrile polymer may be shaped in the form of filaments, yarns, films, tubes and like structures by apparatus and processes generally known in the art, the detailed operating conditions being suitably modified.

Thus, the solution of the example can be extruded through a spinneret into an evaporative atmosphere maintained at a temperature sufficiently high to substantially remove the solvent and, if desired, the bundle of filaments of yarn so coagulated by removal of the solvent can be subjected to a stretching operation as by passage at an elevated temperature between two draw rollers rotating at different rates of linear speed, to orient the micelles of the filaments and thereby increase tenacity as is described in the copending application of Daniel T. Meloon, Serial No. 496,397, filed July 28, 1943. The evaporative medium used in such a process may be any vapor inert to the solution such as air, nitrogen, steam, etc., or any suitable mixture thereof and although the temperature of the evaporative medium is dependent on such factors as the dimensions of the spinning cell, the composition and rate of extrusion of the spinning solution and the rate of flow of the evaporative medium, it is only necessary to so correlate these factors as to free the yarn sufficiently from solvent so that it is solidified and capable of being wound into package form or otherwise collected.

Alternatively, the spinning solution may be extruded through a spinneret into a bath of coagulating liquid which is miscible with the solvent of the spinning solution and which will, by the extraction of said solvent, coagulate the polymer in the spinning solution. Such coagulative medium which will be a chemically inert non-solvent for the polymer may comprise water, glycerin, organic solvents such as alcohol, ether, etc., or aqueous solutions of salts, alkalies or acids and in this wet spinning type of process the stretching and the subsequent orientation of the filaments to improve tenacity, resilience, etc., is preferably performed while the article is in the gel state, e. g. while it still contains a substantial amount of the coagulating bath liquid, the stretching taking place by preference while the coagulating bath is maintained at an elevated temperature, e. g. 100° C. or more. The copending application of William W. Watkins, Serial No. 496,376, filed July 28, 1943, covers the use of glycerol and aqueous solutions of salts as baths, preferably at elevated temperatures, for the wet spinning of acrylonitrile polymer yarn, from solutions of the polymer, preferably with substantial tension and stretch being applied during spinning.

As illustrated in the example, the solution may be cast in the form of a film by passage from a hopper on to a metallic surface such as an endless steel band under the smoothing action of a doctor knife, the solvent being removed either by the dry or evaporative method, or by the wet method utilizing a liquid coagulating bath. Solutions may also be used for the manufacture of molded articles or as lacquers or coating compositions, being especially useful in the coating of wire and electrical parts where high chemical and electrical resistance of the coating is important.

The solution of acrylonitrile polymer dissolved in an organic solvent in accordance with this invention must be of such a concentration that its viscosity at the operating temperature is within a workable range. When it is to be employed in the spinning of yarn or the casting of film, the solution should preferably have a viscosity within the range of 25 to 750 poises. When the polymer has a molecular weight of 250,000 or more, this requires that the maximum concentration of polymer in the spinning solution be of the order of 10%. Generally, it is preferred that the spinning solution contain at least 10% of the polymer because of the difficulty of rapidly removing large amounts of solvent from the solution in the spinning operation. Moreover, it is economically undesirable to use such large amounts of solvent for the spinning of a given amount of polymer although it is true that the solvent can be completely recovered from the spinning operation and reused. For these reasons, it is preferred to employ a polymer having an average molecular weight of between 40,000 and 150,000 since such a polymer forms a solution of the desired viscosity in concentrations of the order of 15% to 25% and at a desirable spinning temperature of the order of 100° to 150° C. Of course, it is within the scope of the invention to heat the solution to a higher temperature, even to above the normal boiling point of the solvent, for the actual spinning operation. Here again, the controlling factor with regard to the temperature of the spinning solution is the viscosity of the solution.

In addition to acting as a solvent, the compound of this invention can also be used as a plasticizing agent for the polymer, when present in small amounts. Non-solvent softeners such as glycerine can also be incorporated in the solutions of this invention to impart a softening effect to the subsequently formed articles.

This invention is primarily concerned with the steps of dissolving polyacrylonitrile in a suitable solvent to form a stable solution adapted for use in the manufacture of shaped articles of polyacrylonitrile. It is characteristic of the invention that the solutions provided by it are stable; the solvent does not cause a decomposition or chemical alteration of the dissolved acrylonitrile polymer. At the same time, it is also characteristic that the solvent provided by the invention is also useful in the dissolving of mixtures of polyacrylonitrile and adjuvants such as dye modifiers, linear polyamides such as nylon, derivatives of cellulose including cellulose ethers and esters, polymers of vinyl compounds such as vinyl chloride, vinyl acetate, acrylic acid, etc., which adjuvants may be incorporated in the acrylonitrile polymer solution to modify the properties, both chemical and physical, of the resulting shaped articles.

This invention provides a solvent for polyacrylonitrile, and copolymers and interpolymers of acrylonitrile which were heretofore considered substantially insoluble. The solvent is capable of forming with the polymer clear solutions that are stable for extended periods of time at both room and elevated temperatures and are admirably suited for use as lacquers or coating compositions or in the manufacture of shaped articles of the polymer, for example by extrusion into an evaporative or coagulative medium, or by the use of a molding technique. The solvent of the present invention is miscible with acrylonitrile polymers containing at least 85% by weight of acrylonitrile in the polymer molecule over a wide range of proportions and is particularly useful in forming solutions containing 5% or more by weight of the polymer.

Reference, throughout the specification and claims to acrylonitrile polymers, polymers of acrylonitrile, and copolymers and interpolymers of acrylonitrile "containing at least 85% by weight of acrylonitrile" signifies polymers containing in their molecules at least 85% by weight of the acrylonitrile unit which is considered to be present in the polymer molecule as the group

that is, at least 85% by weight of the reactant material converted into and forming the polymer is acrylonitrile.

Since it is obvious that many changes and modifications can be made in the above described details without departing from the nature and spirit of the invention, it is to be understood that the invention is not to be limited to the details described herein except as set forth in the appended claims.

I claim:

1. A new composition of matter comprising a polymer of acrylonitrile containing in the polymer molecule at least 85% by weight of acrylonitrile and N,N-dimethylcyanamide.

2. A new composition of matter comprising a polymer of acrylonitrile containing in the polymer molecule at least 85% by weight of acrylonitrile dissolved in N,N-dimethylcyanamide.

3. A new composition of matter comprising polyacrylonitrile dissolved in N,N-dimethylcyanamide.

4. The composition of claim 2 characterized in that the polymer has a molecular weight of between 15,000 and 250,000.

5. The composition of claim 2 characterized in that the polymer has a molecular weight of between 40,000 and 150,000.

6. The composition of claim 2 characterized in that the solution contains at least 10% of the polymer.

7. The composition of claim 2 characterized in that the solution has a viscosity within the range of 25 to 750 poises.

8. The composition of claim 2 characterized in that the polymer of acrylonitrile is polyacrylonitrile having a molecular weight of between 15,000 and 250,000.

9. The composition of claim 2 characterized in that the polymer of acrylonitrile is polyacrylonitrile having a molecular weight of between 40,000 and 150,000.

ARTHUR O. ROGERS.

Certificate of Correction

Patent No. 2,404,725.     July 23, 1946.

ARTHUR O. ROGERS

It is hereby certified that error appears in the printed specification of the above numbered patent requiring correction as follows: Column 3, line 69, for "methylcyanide" read *methylcyanamide*; and that the said Letters Patent should be read with this correction therein that the same may conform to the record of the case in the Patent Office.

Signed and sealed this 15th day of October, A. D. 1946.

[SEAL]

LESLIE FRAZER,
*First Assistant Commissioner of Patents.* both chemical and physical, of the resulting shaped articles.

This invention provides a solvent for polyacrylonitrile, and copolymers and interpolymers of acrylonitrile which were heretofore considered substantially insoluble. The solvent is capable of forming with the polymer clear solutions that are stable for extended periods of time at both room and elevated temperatures and are admirably suited for use as lacquers or coating compositions or in the manufacture of shaped articles of the polymer, for example by extrusion into an evaporative or coagulative medium, or by the use of a molding technique. The solvent of the present invention is miscible with acrylonitrile polymers containing at least 85% by weight of acrylonitrile in the polymer molecule over a wide range of proportions and is particularly useful in forming solutions containing 5% or more by weight of the polymer.

Reference, throughout the specification and claims to acrylonitrile polymers, polymers of acrylonitrile, and copolymers and interpolymers of acrylonitrile "containing at least 85% by weight of acrylonitrile" signifies polymers containing in their molecules at least 85% by weight of the acrylonitrile unit which is considered to be present in the polymer molecule as the group

that is, at least 85% by weight of the reactant material converted into and forming the polymer is acrylonitrile.

Since it is obvious that many changes and modifications can be made in the above described details without departing from the nature and spirit of the invention, it is to be understood that the invention is not to be limited to the details described herein except as set forth in the appended claims.

I claim:

1. A new composition of matter comprising a polymer of acrylonitrile containing in the polymer molecule at least 85% by weight of acrylonitrile and N,N-dimethylcyanamide.

2. A new composition of matter comprising a polymer of acrylonitrile containing in the polymer molecule at least 85% by weight of acrylonitrile dissolved in N,N-dimethylcyanamide.

3. A new composition of matter comprising polyacrylonitrile dissolved in N,N-dimethylcyanamide.

4. The composition of claim 2 characterized in that the polymer has a molecular weight of between 15,000 and 250,000.

5. The composition of claim 2 characterized in that the polymer has a molecular weight of between 40,000 and 150,000.

6. The composition of claim 2 characterized in that the solution contains at least 10% of the polymer.

7. The composition of claim 2 characterized in that the solution has a viscosity within the range of 25 to 750 poises.

8. The composition of claim 2 characterized in that the polymer of acrylonitrile is polyacrylonitrile having a molecular weight of between 15,000 and 250,000.

9. The composition of claim 2 characterized in that the polymer of acrylonitrile is polyacrylonitrile having a molecular weight of between 40,000 and 150,000.

ARTHUR O. ROGERS.

Certificate of Correction

Patent No. 2,404,725.    July 23, 1946.

ARTHUR O. ROGERS

It is hereby certified that error appears in the printed specification of the above numbered patent requiring correction as follows: Column 3, line 69, for "methylcyanide" read *methylcyanamide*; and that the said Letters Patent should be read with this correction therein that the same may conform to the record of the case in the Patent Office.

Signed and sealed this 15th day of October, A. D. 1946.

[SEAL]

LESLIE FRAZER,
*First Assistant Commissioner of Patents.*